United States Patent [19]

Schepers et al.

[11] Patent Number: 5,071,910
[45] Date of Patent: Dec. 10, 1991

[54] THERMOPLASTIC POLYMER MIXTURES

[75] Inventors: Herman A. J. Schepers, Stein; Wilhelmus A. M. Debets, Sittard, both of Netherlands

[73] Assignee: Stamicarbon B.V., Geleen, Netherlands

[21] Appl. No.: 393,003

[22] Filed: Aug. 10, 1989

Related U.S. Application Data

[63] Continuation of Ser. No. 135,237, Dec. 21, 1987, abandoned.

[30] Foreign Application Priority Data

Dec. 20, 1986 [NL] Netherlands .................. 8603246

[51] Int. Cl.$^5$ ............................................. C08L 77/00
[52] U.S. Cl. ......................................... 525/66; 525/179
[58] Field of Search .................................. 525/66, 179

[56] References Cited

U.S. PATENT DOCUMENTS 3,966,839  6/1976  Sims ................................... 525/179
4,421,892 12/1983  Kasahara et al. .................. 524/607

FOREIGN PATENT DOCUMENTS 0068132  1/1983  European Pat. Off. .

OTHER PUBLICATIONS

Chow, "Molecular Weights of Styrene-Maleic Anhydride Copolymers", *Journal of Applied Polymer Science*, vol. 20, 1619–1626 (1976).

*Primary Examiner*—Ana L. Carrillo
*Attorney, Agent, or Firm*—Cushman, Darby & Cushman

[57] ABSTRACT

New polymer composition which has excellent thermal stability, good impact resistance and processability, containing the following compounds:
 a) 20-75 wt. % of a graft copolymer which contains 10-90 wt. % rubber and grafted on the rubber a copolymer of acrylonitrile and styrene or α-methylstyrene
 b) 6-50 wt. % of a copolymer of styrene or α-methylstyrene containing 20-32 wt. % maleic anhydride, with a molecular weight of 50,000–500,000
 c) 5-70 wt. % polyamide and
 d) 0-30 wt. % of a copolymer of styrene or α-methylstyrene and acrylonitrile.

5 Claims, No Drawings

THERMOPLASTIC POLYMER MIXTURES

This is a continuation of application No. 07/135,237, filed Dec. 21, 1987, which was abandoned upon the filing hereof.

The invention relates to a thermoplastic polymer mixture based on a copolymer of a vinyl-aromatic compound and maleic anhyoride and a graft copolymer based on a vinyl-aromatic compound and acrylonitrile on a rubber together with a polyamide.

Graft polymers of vinyl-aromatic compounds and acrylonitrile on butadiene rubber (ABS) are used in many plastic applications in which properties like impact-resistance are of primary importance. ABS is used, for example, for the production of casings for various electrical equipment, but also for the production of certain car parts.

A composition of styrene graft copolymers mixed with polyamides, made compatible by the addition of extra acrylamide, is known from the American patent U.S. Pat. No. 4,496,690. Such blends are only reasonably impact-resistant if they contain an excess of the graft copolymer.

A polymer composition of a polyamide resin, a polystyrene resin and up to 5 wt. % of a styrene maleic anhydride copolymer is described in U.S. Pat. No. 3,966,839. The impact-resistance of such a composition is however inadequate.

Polymer compositions based on ABS, styrene-maleic-anhydride copolymer (SMA), and polyamioe are descrioed in DE-A-3.120.803. By using a low-molecular styrene maleic-anhydride copolymer (SMA) a polymer compostion is obtained which shows a satisfactory impact-resistance per se but the thermal stability of such a composition is inadequate. There is a need for a polymer composition with an optimum balance of properties like impact-resistance, thermal staoility (Vicat, HDT), insentivity to moisture, decomposition-resistance, processability, etc.

The aim of this invention is to provide a polymer composition with such an optimum balance.

The polymer composition according to the invention is character in that the composition comprises:
a) 20–75 wt. % of a graft copolymer of styrene and-/or α-methylstyrene together with acrylonitrile on a rubber, which graft copolymer contains 10–90 wt. % rubber;
b) 6–50 wt. % of a copolymer of a vinyl-aromatic compound containing 15–40 wt. % maleic anhydride, the molecular weight of the copolymer being 50,000–500,000;
c) 5–70 wt. % polyamide;
d) 0–30 wt. % of a copolymer of a vinyl-aromatic compound and acrylonitrile.

The viscosity-average molecular weight ($M_v$) can be determined through a method described om the Journal of Applied Polymer Science, Vol. 20, 1619–1626 (1976), where the authors equated the molecular weight calculated using viscosity with the weight-average molecular weight. By determining the intrinsic viscosity at 25.0° C. in tetrahydrofuran the viscosity-average molecular weight ($M_v$) can be calculated using a single calibration curve. For example, the $M_v$ of maleic anhydride at 5–50 mole % and a molecular weight range of $2 \times 10^4$ to $7 \times 10^6$ can be calcualted using the formula, $$[n] = 3.98 \times 10^{-4} \times M_v 0.596$$

wherein:
[n] = intrinsic viscosity (determined experimentally)
$M_v$ = viscosity-average molecular weight.

Surprisingly, it has now been found that a combination of these components result in a polymer composition with good thermal stability, combined with good impact-resistance and excellent mechanical and processing properties.

The polymer composition according to the invention comprises with advantage:
a) 30–70 wt. % styrene and/or α-methylstyrene together with acrylonitrile on a rubber, with a rubber content of preferably 20–80 wt. %;
b) 7.5–40 wt. % of a copolymer of styrene containing preferably 20–32 % maleic anhydride, the copolymer having a molecular weight of preferably 100,000–300,000;
c) 20–55 wt. % polyamide, and
d) 0–30 wt. % copolymer of styrene and acrylonitrile.

The graft copolymer applied in the polymer composition according to the invention consists of a graft copolymer of styrene and/or α-methylstyrene and acrylonitrile on a rubber.

The rubber is preferably chosen from the group consisting of polybutadiene, butadiene-styrene rubber, butyl acrylate rubber, butadiene-acrylonitrile rubber, Ethylene-propylene-monomer (EPM) and Ethylene-propylene-monomer (EPDM) or mixtures of two or more of these rubbers. The rubber content shall preferably be 10–30 wt. %, based on the complete composition.

The graft copolymer can be prepared in the customary manner, e.g. by mass, solution or suspension polymerization. It is also possible to combine two or more of these polymerization methods to, e.g., mass solution polymerization, mass suspension polymerization or emulsion suspension polymerization. Polymerization is preferably effected in the presence of the customary substances, such as free radical donors, optionally in combination with a redox system, chain length regulators, stabilizers, suspending agents, emulsifiers, and the like.

The copolymer of styrene and maleic anhydride to be used according to the invention shall have a high molecular weight of 50,000–500,000, preferably 100,000–300,000. The maleic anhydride content is 15–40 wt. %, preferably 20–32 wt. %. The upper limit of the maleic anhydride content is determined by the processability of the copolymer, while the advantages of high-molecular SMA are practically non-existent below the lower limit. The copolymer can be produced in the manner commonly applied for the production of statistical, nonalternating copolymers of styrene and maleic anhydride. A possible procedure is described in Hanson and Zimmerman, Ind. Chem. Eng. Vol. 49, No. 11, November 1957, 1803 through 1807. It is in any case advantageous that the polymerization is carried out continuously, under well-mixed conditions, because otherwise an alternating copolymer of styrene and maleic anhydride, sometimes combined with a styrene homopolymer, is obtained. The copolymer of styrene and maleic anhydride may contain 0.1–5 wt. % of other monomers like acrylonitrile, methyl methacrylate, and imides like N-phenyl maleimide. However, this is not necessary. EP-A-202.706 describes the preparation of high-molecular SMA in detail.

The polyamides used in the composition according to the invention are known per se, notably the conventional polyamide resins known under the name of nylon, including the aliphatic polylactams like polycaprolactam, nylon 6. Nylon 4.6, nylon 6.6, nylon 6.10, nylon 11 and nylon 12 may also be used. In addition, copolyamides, aromatic nylons and semi-aromatic nylons may be used.

The copolymers of styrene and/or α-methylstyrene with acrylonitrile that may be used are the well known styrene-acrylonitrile (SAN) and/or α-methylstyreneacrylonitrile (α-MSAN) copolymers. The copolymer can be produced in the manner commonly applied, for example, by emulsion polymerization mass polymerization and suspension polymerization or a combination thereof. The copolymers are high-molecular and contain 20–40 wt. % acrylonitrile. They may contain small amounts of other comonomers like acrylates.

In addition, the polymer composition according to the invention contains at most 40 wt. % of the usual additives like colourants, pigments, flame retardants, stabilizers, lubricants, fillers, inorganic fillers, glass fibre, etc.

The polymer composition can be produced by mixing various components in the melt. The well-known mixing devices like roll mills, batch kneaders and extruders may be used for this purpose. The composition of the mixture may be adapted by experts, according to the intended application. An increase in the styrene maleic-anhydride copolymer content results in improved stiffness at higher temperatures. An increase in the graft copolymer content results in greater impact-resistance. The substance then becomes less fluid, which can be compensated for by the addition of extra styrene-acrylonitrile copolymer. Both copolymers improve the sensitivity to moisture and the mould shrinkage of the mixture. The polyamide improves the resistance to organic solvents and wear resistance. The experts can also improve other properties by adapting the composition of the mixture.

The polymer composition according to the invention is very suitable for the production of many different objects, like parts of electrical equipment, components for the automotive industry, but also garden furniture and sports articles.

The invention is further elucidated with the help of the following examples, without, however, being limited thereto.

EXAMPLES

General procedure. The following were fed to a batch kneader (Brabender PLE 330, volume 50 ml):
1. polyamide, nylon 6, Ultramid B3$^R$, BASF.
2. ABS; ABS graft copolymer, containing 40% butadiene rubber and 27 wt. % acrylonitrile, based on the SAN phase.
3. One of the following styrene. maleic-anhydride polymers:

SMA-1; 33 wt. % MA, Mv 1700
    SMA-2; 14 wt. % MA, Mv 200,000
    SMA-3; 22 wt. % MA, Mv 200,000
    SMA-4; 28 wt. % MA, Mv 160,000
4. Styrene-acrylonitrile copolymer (SAN), containing 27 wt. % acrylonitrile.
5. Stabilizers and lubricants like 0.45 wt. % stabilizer, di-stearylthiodipropionate (DSTDP) 0.45 wt. % stabilizer, 1,1 bis-(5-tert.butyl-4-hydroxy-2-methylphenyl)butane 1 wt. % lubricant, oxidized polyethylene wax 0.1 wt. % boric acid, stabilizer.

The mixture was mixed for 10 minutes, at a temperature of 230° C. and a speed of 30 RPM, and subsequently compression moulded for 12 minutes, at a temperature of 230° C., into 3 mm thick plates. Of the plates thus obtained the following was determined.
1. Izod at 23° C. according to ISO 180 (KJ/m$^2$), upon vacuum drying, at 60° C., for 24 hours.
2. HDT, annealed, according to ASTM D 648 (°C.), at 1.8 MPA.

Table 1 lists the components mentoned and gives a survey of the properties determined.

TABLE 1

| Example | Nylon % | ABS % | SMA-1 % | SMA-2 % | SMA-3 % | SMA-4 % | SAN % | Izod KJ/m$^2$ | HDT °C. | Rubber % |
|---|---|---|---|---|---|---|---|---|---|---|
| A* | 35 | 50 | 15 | — | — | — | — | 2.9 | 93 | 20 |
| B* | 35 | 50 | — | 15 | — | — | — | 5.7 | 96 | 20 |
| 1 | 35 | 50 | — | — | — | 15 | — | 53.0 | 112 | 20 |
| 2 | 40 | 50 | — | — | 10 | — | — | 34.0 | 96 | 20 |
| 3 | 40 | 50 | — | — | — | 10 | — | 64.0 | 101 | 20 |
| 4 | 45 | 35 | — | — | — | 20 | — | 32.0 | 115 | 14 |
| 5 | 40 | 35 | — | — | — | 20 | 5 | 30.0 | 116 | 14 |
| 6 | 40 | 40 | — | — | — | 20 | — | 35.0 | 113 | 16 |
| 7 | 32.5 | 42.5 | — | — | — | 25 | — | 25.0 | 119 | 17 |
| 8 | 20 | 40 | — | — | — | 40 | — | 15.0 | 127 | 16 |
| 9 | 50 | 30 | — | — | — | 20 | — | 29.0 | 115 | 12 |
| 10 | 55 | 25 | — | — | — | 20 | — | 19.0 | 111 | 10 |
| 11 | 30 | 50 | — | — | — | 20 | — | 43.0 | 115 | 20 |
| 12 | 25 | 50 | — | — | — | 25 | — | 37.0 | 118 | 20 |
| 13 | 37.5 | 55 | — | — | — | 7.5 | — | 52.0 | 95 | 22 |
| 14 | 35 | 55 | — | — | — | 10 | — | 65 | 100 | 22 |
| 15 | 30 | 60 | — | — | — | 10 | — | 64 | 98 | 24 |
| 16 | 30 | 60 | — | — | 10 | — | — | 58 | 97 | 24 |
| 17 | 35 | 55 | — | — | 10 | — | — | 47 | 96 | 22 |
| 18 | 30 | 55 | — | — | — | 15 | — | 51 | 111 | 22 |
| 19 | 20 | 55 | — | — | — | 25 | — | 36 | 118 | 22 |
| 20 | 40 | 45 | — | — | — | 15 | — | 56 | 111 | 18 |
| 21 | 35 | 45 | — | — | — | 20 | — | 39 | 115 | 18 |
| 22 | 30 | 45 | — | — | — | 25 | — | 26 | 118 | 18 |

*A,B: not according to the invention.

COMPARATIVE EXAMPLES C THROUGH F

On the analogy of the previous examples, the components listed in table 2 were produced.

TABLE 2

| Example | Nylon % | ABS % | SMA-1 % | SMA-2 % | SMA-3 % | SMA-4 % | Izod KJ/m² | HDT °C. | Rubber content % |
|---------|---------|-------|---------|---------|---------|---------|------------|---------|------------------|
| C | 40 | 55 | 5 | — | — | — | 4 | 91 | 22 |
| D | 40 | 55 | — | 5 | — | — | 6 | 92 | 22 |
| E | 40 | 55 | — | — | 5 | — | 10 | 93 | 22 |
| F | 40 | 55 | — | — | — | 5 | 12 | 93 | 22 |

When 5% SMA polymer was used, the favourable combination of HDT and Izod aimed at was not obtained in any of these cases.

We claim:

1. Polymer composition comprising:
   a) 20–75 wt. % of a graft copolymer comprising 10–90 wt. % rubber and 90–10 wt. % of a copolymer grafted on the rubber, said copolymer comprising acrylonitrile and styrene or α-methylstyrene,
   b) 6–50 wt. % of a copolymer consisting of 20–32 wt. % maleic anhydride and styrene or α-methylstyrene, said copolymer having a molecular weight of 50,000–500,000,
   c) 5–70 wt. % polyamide, and
   d) 0–30 wt. % of a copolymer consisting essentially of acrylonitrile and styrene or α-methylstyrene.

2. Polymer composition according to claim 1, characterized in that it comprises:
   a) 30–70 wt. % of the graft copolymer, which graft copolymer contains 20–80 wt. % rubber;
   b) 7.5–40 wt. % styrene maleic anhydride copolymer;
   c) 20–55 wt. % polyamide; and
   d) 0–30 wt. % copolymer of styrene acrylonitrile.

3. Polymer composition according to any one of claims 2 or 1, characterized in that the molecular weight of the styrene maleic-anhydride copolymer is 100,000–300,000.

4. Polymer composition according to any one of claims 2 or 1, characterized in that the rubber content is 10–30 wt. % based on the entire composition.

5. Object manufactured entirely or partially of a polymer composition according to any one of claims 2 or 1.

* * * * *